(12) United States Patent
Haynold (10) Patent No.: US 11,252,321 B1
(45) Date of Patent: *Feb. 15, 2022

(54) METHOD AND APPARATUS FOR SELECTING MULTIPLE DIRECTIONS OF INTEREST

(71) Applicant: Oliver Markus Haynold, Evanston, IL (US)

(72) Inventor: Oliver Markus Haynold, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,061

(22) Filed: Aug. 3, 2019

Related U.S. Application Data (63) Continuation of application No. 14/797,120, filed on Jul. 11, 2015, now Pat. No. 10,419,658.

(60) Provisional application No. 62/026,701, filed on Jul. 20, 2014.

(51) Int. Cl.
*H04N 5/232* (2006.01)
*G03B 13/36* (2021.01)

(52) U.S. Cl.
CPC ....... *H04N 5/232127* (2018.08); *G03B 13/36* (2013.01); *H04N 5/23216* (2013.01); *H04N 5/23222* (2013.01); *H04N 5/23245* (2013.01); *H04N 5/23258* (2013.01); *H04N 5/232933* (2018.08); *H04N 5/232945* (2018.08)

(58) Field of Classification Search
CPC .......... H04N 5/23212; H04N 5/23219; H04N 5/232127; H04N 5/23248–23261; H04N 5/23293; H04N 5/235–243; G03B 13/36
See application file for complete search history.

(56) References Cited

U.S. PATENT DOCUMENTS

| | | |
|---|---|---|
| 2,210,090 A | 8/1940 | Lutz et al. |
| 4,080,531 A | 3/1978 | Stauffer |
| 4,236,794 A | 12/1980 | Gordon |
| 5,128,705 A | 7/1992 | Someya et al. |
| 5,473,403 A | 12/1995 | Suda et al. |
| 5,528,330 A | 6/1996 | Utagawa |
| 5,701,524 A | 12/1997 | Kusaka et al. |
| 5,740,478 A | 4/1998 | Kobayashi |
| 5,749,000 A | 5/1998 | Narisawa |
| 5,950,022 A | 9/1999 | Hagiwara |
| 6,148,153 A | 11/2000 | Kusaka et al. |
| 6,584,284 B1 | 6/2003 | Odaka |
| 6,614,998 B1 | 9/2003 | Senba et al. |
| 6,801,717 B1 | 10/2004 | Hofer |
| 6,812,968 B1 | 11/2004 | Kermani |
| 7,409,149 B2 | 8/2008 | Spielberg |
| 7,646,972 B2 | 1/2010 | Dunko et al. |
| 7,787,025 B2 | 8/2010 | Fujisawa |
| 7,791,669 B2 | 9/2010 | Nonaka |

(Continued)

FOREIGN PATENT DOCUMENTS

WO 2010149763 A1 12/2010

*Primary Examiner* — Paul M Berardesca (57) ABSTRACT

According to some embodiments, a portable camera equipped with an autofocus system is also equipped with a microelectromechanical rotation sensor. The camera's processor uses rotation data provided by this sensor to correct focus as the camera is a rotated and displays the new orientation of the area of interest for autofocus to the user on a display. Focus may be adjusted on user command only or continuously, and one or more areas of interest may be chosen. Additional applications are shown.

31 Claims, 6 Drawing Sheets

(56) References Cited

U.S. PATENT DOCUMENTS

| | | |
|---|---|---|
| 7,844,174 B2 | 11/2010 | Pickens et al. |
| 8,054,366 B2 | 11/2011 | Hirai |
| 8,059,949 B2 | 11/2011 | Mogamiya |
| 8,265,475 B2 | 9/2012 | Maeda |
| 8,558,941 B2 | 11/2013 | Nozaki |
| 8,908,083 B2 | 12/2014 | Brunner et al. |
| 10,419,658 B1 * | 9/2019 | Haynold ............ H04N 5/23222 |
| 2007/0098380 A1 | 5/2007 | Spielberg |
| 2008/0079837 A1 | 4/2008 | Masubuchi |
| 2008/0151096 A1 | 6/2008 | Okada |
| 2008/0317453 A1 | 12/2008 | Yuyama |
| 2010/0026821 A1 | 2/2010 | Sato et al. |
| 2010/0315528 A1 | 12/2010 | Goh |
| 2011/0115945 A1 | 5/2011 | Takano et al. |
| 2011/0267524 A1 | 11/2011 | Lee et al. |
| 2012/0075492 A1 | 3/2012 | Nanu et al. |
| 2012/0120277 A1 | 5/2012 | Tsai |
| 2012/0237193 A1 | 9/2012 | Kawarada |
| 2012/0268645 A1 | 10/2012 | Chen et al. |
| 2013/0169854 A1 | 7/2013 | Ge et al. |
| 2014/0092272 A1 | 4/2014 | Choi |
| 2014/0104445 A1 | 4/2014 | Ramachandran et al. |

* cited by examiner

Fig. 1
PRIOR ART NOT CLAIMED

METHOD AND APPARATUS FOR SELECTING MULTIPLE DIRECTIONS OF INTEREST

RELATED APPLICATIONS

This application is a continuation of and claims priority from my utility patent application Ser. No. 14/797,120, filed on 11 Jul. 2015, for a Camera Optimizing for Several Directions of Interest, which is hereby incorporated into this application in its entirety.

Application Ser. No. 14/797,120 in turn claims priority from my provisional patent application 62/026,701, filed on 20 Jul. 2014, for a Motion-dependent Autofocus, which is hereby incorporated into this application in its entirety.

FIELD OF THE INVENTION

This invention relates to the field of selecting focus points or other points of interest, particularly in a camera.

PRIOR ART

The following is a tabulation of some prior art parent documents that appear relevant:

U.S. Patents

| Patent Number | Kind Code | Issue Date | Patentee |
| --- | --- | --- | --- |
| 2,210,090 | A | 1940 Aug. 6 | Lutz & Peace |
| 4,080,531 | A | 1978 Mar. 21 | Stauffer |
| 4,236,794 | A | 1980 Dec. 2 | Gordon |
| 5,128,705 | A | 1992 Jul. 7 | Someya et al. |
| 5,473,403 | A | 1995 Dec. 5 | Suda et al. |
| 5,528,330 | A | 1996 Jun. 18 | Utagawa |
| 5,701,524 | A | 1997 Dec. 23 | Kusaka et al. |
| 5,740,478 | A | 1998 Apr. 14 | Kobayashi |
| 5,749,000 | A | 1998 May 5 | Narisawa |
| 5,950,022 | A | 1999 Sep. 7 | Hagiwara |
| 6,148,153 | A | 2000 Nov. 14 | Kusaka et al. |
| 6,584,284 | $B_1$ | 2003 Jun. 24 | Odaka |
| 6,801,717 | $B_1$ | 2004 Oct. 5 | Hofer |
| 6,812,968 | $B_1$ | 2004 Nov. 2 | Kermani |
| 7,409,149 | $B_2$ | 2005 Aug. 5 | Spielberg |
| 7,646,972 | $B_2$ | 2010 Jan. 12 | Dunko & Vasa |
| 7,787,025 | $B_2$ | 2010 Aug. 31 | Sanno & Fujisawa |
| 7,791,669 | $B_2$ | 2010 Sep. 7 | Nonaka |
| 7,844,174 | $B_2$ | 2011 Nov. 30 | Pickens & Dunnigan |
| 8,054,366 | $B_2$ | 2011 Nov. 8 | Hirai |
| 8,059,949 | $B_2$ | 2011 Nov. 15 | Mogamiya |
| 8,265,475 | $B_2$ | 2012 Sep. 11 | Maeda |
| 8,558,941 | $B_2$ | 2013 Nov. 15 | Nozaki |
| 8,908,083 | $B_2$ | 2014 Dec. 9 | Brunner & Chen |

U.S. Patent Application Publications

| Publication Number | Kind Code | Publication Date | Applicant |
| --- | --- | --- | --- |
| 2008,007,9837 | $A_1$ | 2008 Apr. 3 | Masubuchi |
| 2012,007,5492 | $A_1$ | 2012 Mar. 29 | Nanu et al. |
| 2012,012,0277 | $A_1$ | 2012 May 17 | Tsai |
| 2013,016,9854 | $A_1$ | 2013 Jul. 4 | Ge et al. |
| 2014,009,2272 | $A_1$ | 2014 Apr. 3 | Choi |
| 2014,010,4445 | $A_1$ | 2014 Apr. 17 | Ramachandran et al. |

Foreign Application Publications

| Publication Number | Kind Code | Publication Date | Applicant |
| --- | --- | --- | --- |
| WO 2010,149,763 | $A_1$ | 2010 Dec. 29 | Poulsen |

BACKGROUND

Ever since the invention of photography it has been a problem to focus the lens of a camera on the subject to be photographed. Myriads of images that otherwise would have turned out well have been ruined by the subject being out of focus. This problem has been greatly alleviated by the introduction of autofocus system approximately since the 1970s. Yet, using existing autofocus systems often is clunky and time-consuming, and popular techniques for using autofocus systems have a tendency to produce out-of-focus images.

The first major method of controlling an autofocus is the half-press technique. Many cameras are equipped with a shutter button that has two stages, the first stage being called 'half press' and the second stage being called 'full press'. The photographer sets the focus by pointing a particular area of the camera's field of view, in the simplest case the center of the field of view, to the subject area he wants to focus the camera on. Then he presses the shutter button to the half-press position. This will cause the cameras autofocus to engage and to focus the lens so that the subject at that special area of the camera's field of view is in focus. Then that focus gets locked. The photographer can now recompose the picture by rotating the camera slightly, for example to bring the subject into a more interesting position than straight in the center of the picture, or to bring another, secondary subject into the field of view as well. When the photographer is satisfied with the image he has composed he presses the shutter button all the way and the camera takes a picture. This is fast because the focus, and perhaps also other image parameters such as exposure, have already been set at the half-press stage so that the camera can take an image with little shutter lag.

The second major method of controlling an autofocus is to select on the camera which part of the camera's field of view the autofocus should keep in focus. This can be accomplished by using a control wheel or joystick to move the point of focus, or on some newer cameras, especially those built into mobile telephones or other multimedia devices, it can be accomplished by pointing to an area of an image preview on a touchscreen. Either way of controlling the focus is rather cumbersome. Using dedicated control elements to change the focus area typically requires using several control elements on the camera, such as pressing a button and operating a wheel or joystick simultaneously. Using a touchscreen typically requires changing the way the camera is held in the hand compared to the preferred way the photographer holds the camera for taking a picture. Because this way is so time-consuming, many photographers prefer to use the half-press method. On some cameras, especially those equipped with phase-detection autofocus, the camera may also be faster to focus or be able to focus in lower light conditions if it uses the autofocus sensor corresponding to the center of the camera's field of view.

The two methods described can also be combined, by first selecting an approximate area of focus in the camera's field of view and then using the half-press technique.

Figure 1:
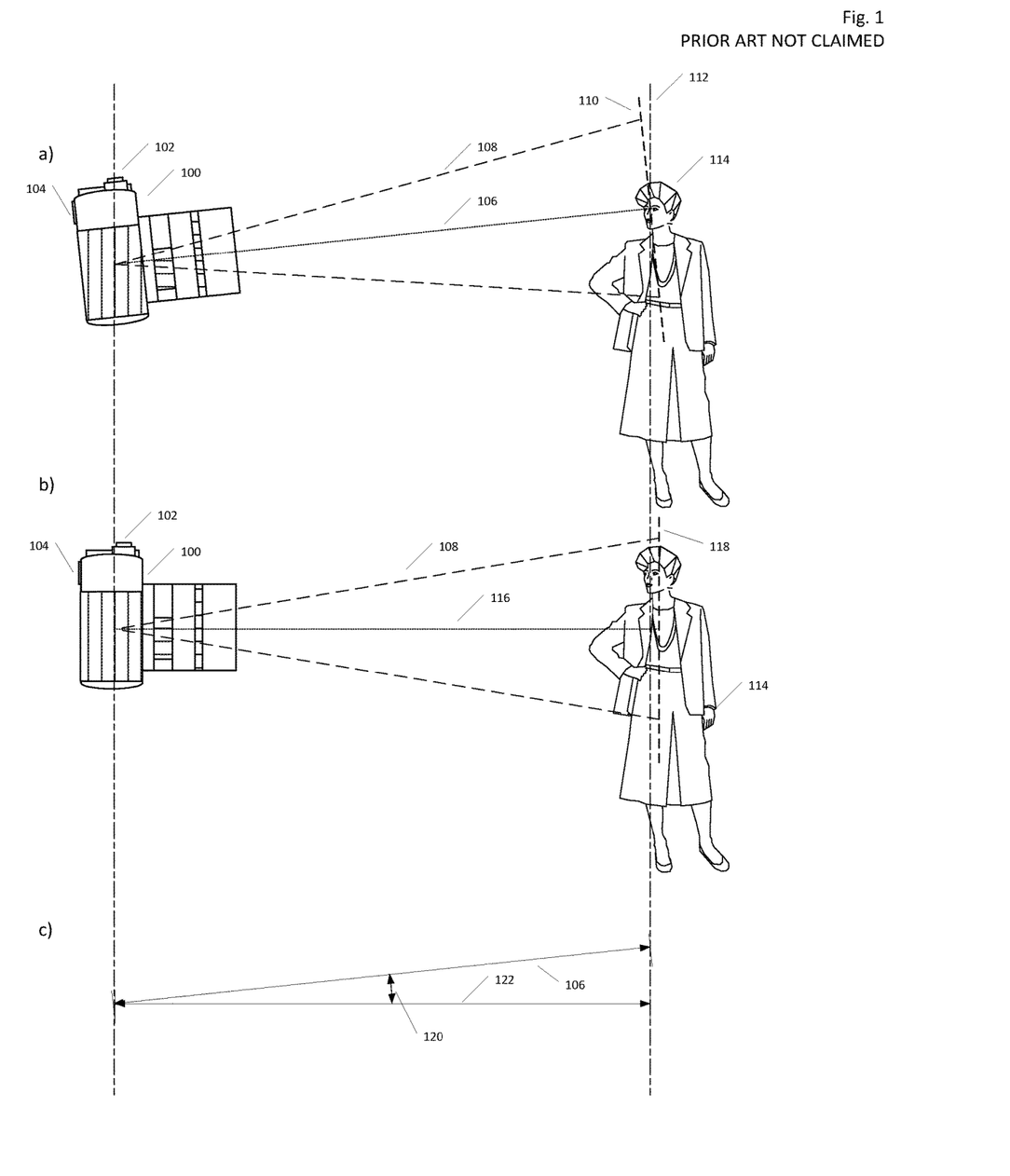
FIG. 1—PRIOR ART NOT CLAIMED shows the unintended shift in the plane of focus when a photographer uses the half-press technique.

The popular and quick half-press technique suffers from a fundamental problem, however. Consider the situation in FIG. 1. The photographer wants to take a picture of the subject 114. He would like the subject's eyes to be exactly in focus, but the subject's head to be above center in the picture to be taken. Thus, he points, as shown in FIG. 1 a) the camera 100 so that the subject's eyes are in the center of the camera's field of view 108. He now half-presses the shutter button 102. The camera focusses on what is at the center of its field of view, the subject's eyes, so if the photographer took a picture right now, the focus would be correct. The camera's plane of focus would be plane 110.

However, the photographer would like to show more of the subject's body in the picture and thus recomposes the picture as shown in FIG. 1 b). The distance from the camera to the subject has not changed, and yet the new plane of focus 118 is behind the subject's eyes. Thus, especially with a wide aperture or a long focal width, the subject's eyes will no longer be in focus.

The distance between the actual new focus plane after the image has been recomposed 118 and the desired plane of focus 112 can be calculated by simple trigonometry in the two-dimensional example of FIG. 1 and it applies equally to three-dimensional real-world cases. If the photographer locks the focus on the center of the camera's field of view and then recomposes the picture, the actual focus plane 118 will always be behind, from the camera's point of view, the desired focus plane 112. If the photographer locks the focus on a focal point selected that is not in the center of the camera's field of view, the effect may go the other way as well bringing the actual focus plane in front of the desired focus plane.

This effect becomes the more troublesome the smaller the camera's depth of field is. It is a particular problem in applications where one often uses a wide aperture or a long focal width, such as in portrait photography or in sports photography, and the problem gets worse the larger the angle by which the image is recomposed becomes.

Spielberg (U.S. Pat. No. 7,409,149) teaches a camera that overcomes some of the difficulties just described by incorporating an attitude sensor in a camera, measuring an exposure distance on a user command to lock focus, and adjusting the focus before a picture is taken in response to the camera's change in attitude between locking focus and taking the picture.

Tsai (U.S. 2012,012,0277) teaches a method to select multiple focus points on a camera using a touch screen.

Gordon (U.S. Pat. No. 4,236,794) teaches a self-focusing camera using purely mechanical means or alternatively electronic means that sets focus based on the camera's spatial orientation.

SUMMARY

According to some embodiments, a portable camera equipped with an autofocus system is also equipped with a microelectromechanical rotation sensor. The camera's processor uses rotation data provided by this sensor to correct focus as the camera is a rotated and displays the new orientation of the area of interest for autofocus to the user on a display. Focus may be adjusted on user command only or continuously, and one or more areas of interest may be chosen. Additional applications are shown.

Advantages

Some advantages of some embodiments include:
a) Photographers may select a point of interest for an autofocus using the popular half-press technique; shifts in focus distance caused by recomposing the picture get automatically compensated, and the photographer obtains immediate visual feedback about the area of interest.
b) An easy user interface allowing a photographer to select a point or several points of interest for an autofocus system primarily by pointing the camera at the point of interest without the need for complex user interfaces.
c) Quick reaction of the camera as focal distance changes when the camera is rotated, allowing anticipation of changing the camera focus and correspondingly quicker focus times.
d) Ability to pick between one-time autofocus operation with subsequent correction and continuous autofocus.
e) Ability to use continuous autofocus makes the system suitable for capturing video.
f) Ability to see the effect of the focus compensation immediately before taking the picture.

DRAWINGS—REFERENCE NUMERALS

100 Camera
102 Shutter button
104 Viewfinder
106 Lens axis at half-press
108 Camera field of view
110 Initial focus plane on half-press autofocus
112 Desired focus plane
114 Subject
116 New lens axis after image has been recomposed
118 New focus plane after image has been recomposed
120 Angle between lens axis at half press and after image has been recomposed
122 Correct focus distance to keep plane 112 in focus
200 Camera
202 Shutter button
204 Viewfinder
206 Autofocus select button
208 Autofocus continuous mode switch
azo Autofocus map switch
300 Viewfinder
302 Subject
304 Selected focus point
306 Position of focus area of interest
400 First subject
402 Second subject
500 Photographer 502 Sports field
504 First point of interest on the sports field
506 Second point of interest on the sports field
508 Distance to first point of interest
520 Distance to second point of interest
600-620 labeled on drawing

DETAILED DESCRIPTION—FIGS. 2-5—FIRST EMBODIMENT

The reader will now see that all of the prior art makes it rather hard to set focus precisely on a specific image element, especially in situations where the subject of the image might also be moving, such as in sports photography and in capturing video.

Figure 2:
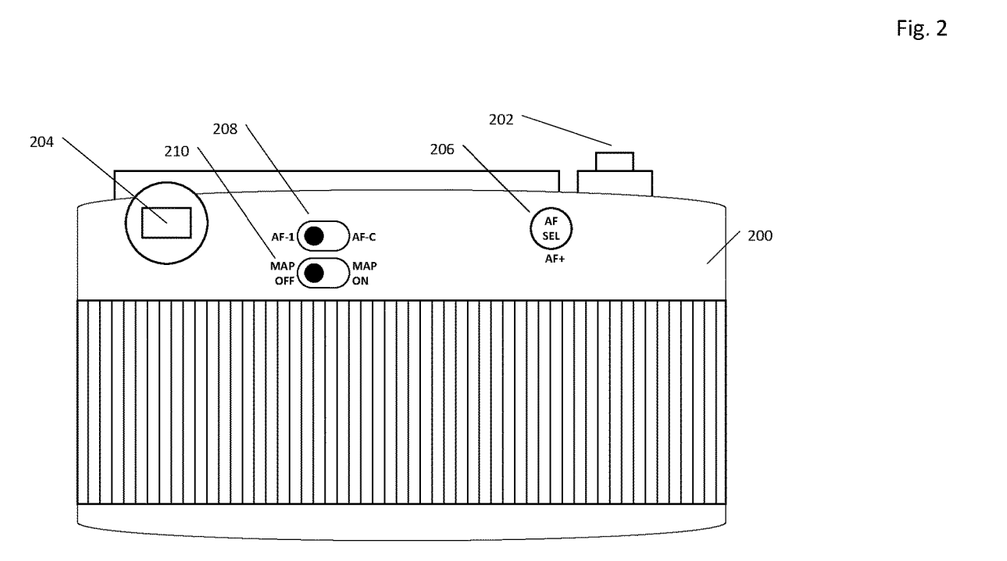
FIG. 2 shows the physical user interface of the first embodiment.

FIG. 2 shows the physical user interface of the first embodiment. A camera 200 is equipped with a shutter button 202, that shutter button being of the half-press type, a viewfinder 204, an autofocus select button 206, and autofocus continuous mode switch 208, and an autofocus map button 210. The camera is also equipped with additional elements commonly found in cameras but not shown from the perspective of FIG. 2, in particular a lens, an image sensor, a processor, and image storage.

Figure 3:
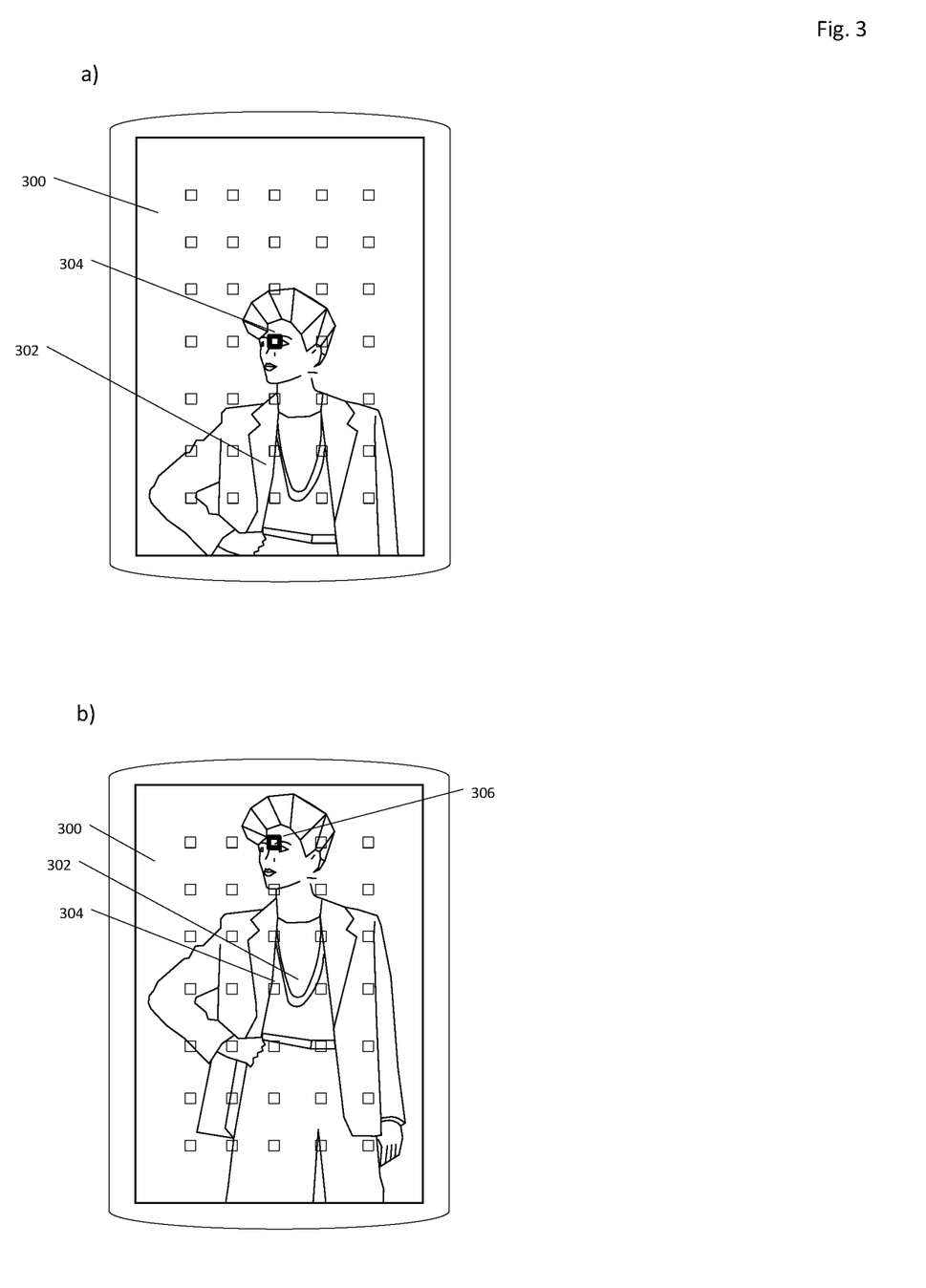
FIG. 3 shows a scenario for taking a portrait with the first embodiment.

The camera of the first embodiment is also equipped with means to verify whether the a given element of the picture is currently in focus and to adjust focus if needed. This may be achieved with an array of dedicated phase-detection sensors separate from the image sensor, as is commonly found particularly in single-lens reflex cameras. Alternatively, it may be achieved with phase-detection sensors integrated into the camera's image sensor. Yet another possibility is to use contrast maximization for autofocus using the pixel output from the camera's image sensor in a given region of interest. Further, the camera is equipped with a display showing which area of the image is currently the area of interest to optimize focus for. If the camera is equipped with an optical viewfinder, this may be achieved by markings of possible focus points such as the little squares visible in the view through the viewfinder 300 shown in FIG. 3, where the currently selected focus points are illuminated by means of a light-emitting diode, such as selected focus point 304. Alternatively, the camera may be equipped with an electronic viewfinder or an external display used in lieu of a traditional viewfinder. In this case, the selected focus point or focus area 304 may be highlighted on the electronic viewfinder's display by overlaying a rectangle around it. Depending on the focus method and display chosen, available focus points may be either a discrete set of discontinuous points, as is shown in FIG. 3, or focus points may be shifted across the camera's field of view in a substantively continuous manner. For a specific implementation one has to make a tradeoff between the capabilities offered by the various focus sensors and display methods available. Contrast-detection autofocus with an electronic display allows a substantively continuous motion of the selected focus area, which is beneficial for reasons that shortly will become apparent, and is suitable for video. However, dedicated discrete phase-detection sensors tend to offer faster focussing, especially in low-light situations. A camera may also incorporate several of these possibilities together and offer its user, for example, the choice between using an optical viewfinder and dedicated phase detection sensors or using a display as a viewfinder and using contrast maximization or on-sensor phase detection elements for autofocus (commonly called 'live mode' in cameras offering this choice).

The camera may allow the choice of different image-taking modes, and it may also allow the photographer to capture video instead of still images.

The camera may further be equipped with a microelectromechanical (MEMS) sensor capable of sensing rotation in three dimensions, which may be one of the MEMS gyroscope sensors made by Analog Devices of Norwood, Mass. Other means of rotation sensing, such as laser gyroscopes, may be used in some embodiments. The camera's processor is connected to the MEMS sensor and running routines, as are well known in the art, to integrate the MEMS sensor's output into a rotational position of the camera in three spatial axes, where the reference frame of said three axes may be arbitrarily chosen. The camera's rotational position may be represented by any of a number of ways known in the art to represent rotational position in space, such as Euler angles or quaternions. It can be advantageous to supplement the rotation sensor with additional sensors, such as acceleration sensors measuring gravity in three axes or magnetic field sensors measuring the earth's magnetic field in three axes. Since gravity and the earth's magnetic field are in approximation locally uniform force fields, a Kálmán or other state space filter may be used to eliminate sensor drift from the rotation sensors, a technique well-known in the art. If the camera is equipped with user-changeable lenses, those lenses may include an electronic means of communicating the focal width of the lens presently installed.

Figure 6:
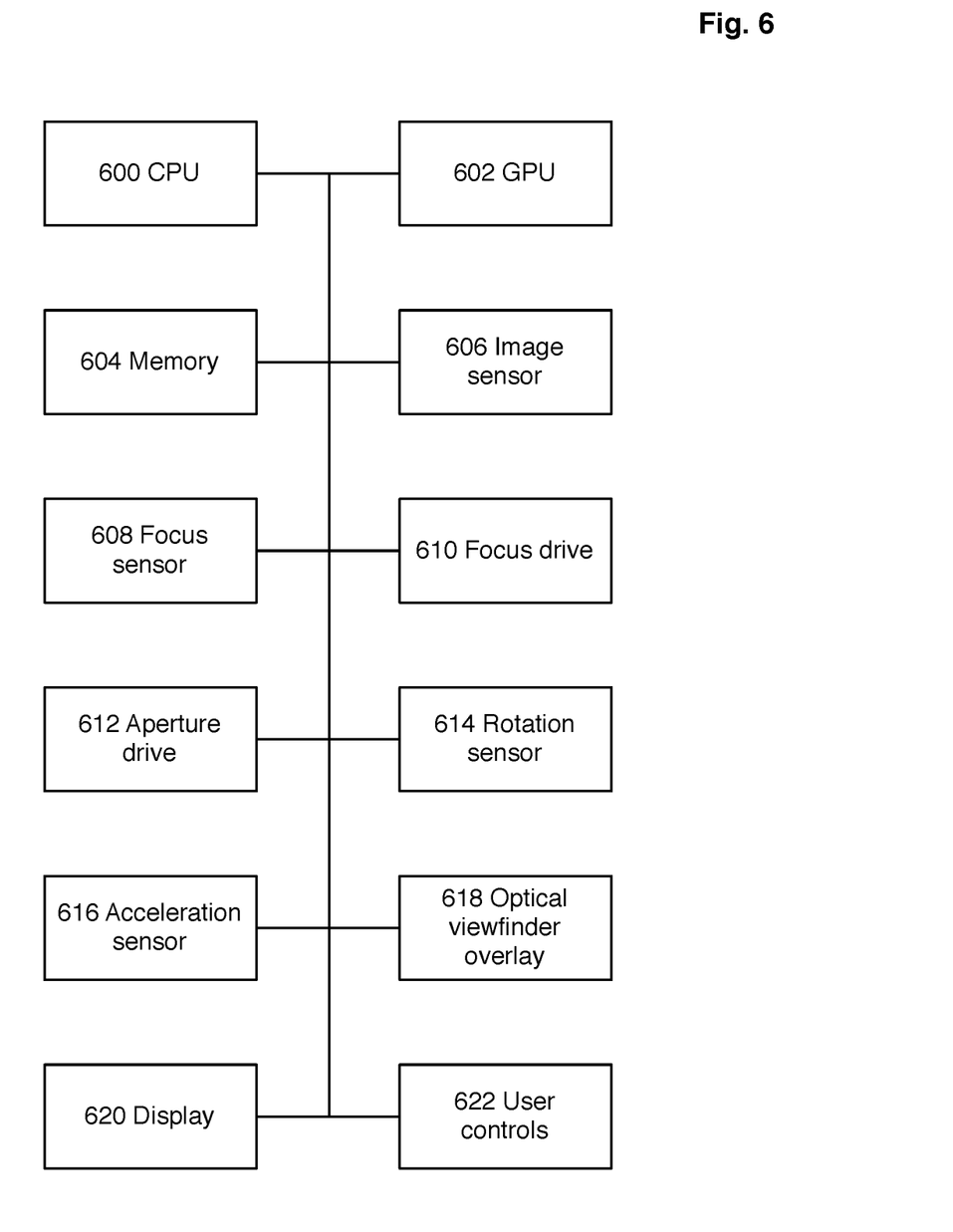
FIG. 6 shows the electronic bus system for the first embodiment.

FIG. 6 shows an electronic bus system of the first embodiment. The camera may be equipped with a central processing unit 600, a graphics processing unit 602, and system memory 604. These components may be separate or part of one integrated circuit. The camera may also be equipped with an image sensor 606, and a focus sensor 608, which may be integrated into the image sensor 606, be a separate component, or may also be omitted if contrast registered by the image sensor 606 is to be used as an indication of proper focus. The camera may be equipped with electromotoric focus drive 610 and aperture drive 612. It may be equipped with a microelectromechanical rotation sensor 614 and an a microelectromechanical acceleration sensor 616. It may be equipped with an optical viewfinder overlay 618, a display 620, or both. It may also be equipped with user controls 622, typically comprising a shutter button and several control buttons, paddles, or wheels, or a touch-sensitive screen.

We will now consider several modes of operating the first embodiment and its functionality.

Basic Operation: FIG. 3

The first example of the embodiment's operation is shown in FIG. 3. The camera is in a normal operating mode, the switch 208 is set to 'AF-1', and the switch 210 is set to 'MAP OFF' The user wants to take an image of the subject 302, similar to the situation in FIG. 1. FIG. 3 a) shows the situation in the viewfinder as the photographer sets the focus for the image. The viewfinder 300 shows a number of possible focus points which may correspond to phase detection autofocus sensors the camera is equipped with. The highlighted point 304 shows that the autofocus point in the center of the field of view is selected. The photographer now pushes the shutter button to the half-press position, waits for an audible confirmation that the autofocus has locked, and holds the button in half press while recomposing. So far everything is as on a conventional camera.

Now, as shown in FIG. 3 b), the photographer recomposes the image so that the subjects eyes are no longer at the center of the image. The MEMS rotational sensor in the camera registers this rotation, and as the camera's processor receives updates of said rotation it calculates the shift of the focal distance necessary to keep the point that was selected when the focus was locked in focus as explained in the Background section. A number of different ways of performing this calculation are well-known in the art. I currently prefer representing the camera's rotational position in space as a quaternion and the selected point as well as the focal planes by vectors. The camera also turns off the point-of-interest indicator 304 and illuminates the point-of-interest indicator 306 closest to the position of the originally focussed subject that the camera attempts to keep in focus. This does not mean that the camera is using a different phase detection autofocus sensor now. In fact, it is not operating any autofocus sensor since the focus has been locked on half-press. It is merely adjusting the focus so as to keep the focal plane intersecting with the point in space for which the focus was locked. The mathematics for changing the point-of-focus indicator from knowledge of the lens's focal length relative to the size of the image sensor and the camera rotation again are well known in the art and may, for example, be accomplished by representing the camera rotation as a quaternion.

When the photographer now pushes the shutter button to the full-press position, the camera will take a picture with the subject's eyes perfectly focussed and the problem explained in the Background section has been solved.

Continuous Autofocus: FIG. 3

A different mode of operation can be accomplished in the same scenario as in the previous example with the switch 208 in the position 'AF-C' for continuous autofocus operation. In the previous example, the autofocus was locked on the actuation of the half-press button. This works well for a static image subject and allows for very fast shutter response when the shutter button is fully pressed. Locking the autofocus is less desirable when the subject is moving, and for these situations the continuous autofocus operation offers a different solution. Continuous autofocus is also especially desirable when the photographer wants to take a video recording instead of a still image.

With the autofocus in continuous operation, when the shutter button is engaged in half-press mode the autofocus gets activated but keeps continuously readjusting the focus distance to keep the area at the selected point of interest in focus. This mode is available on many cameras today. Clearly, this mode on a prior-art camera would not lend itself well for the scenario in FIG. 3; as the photographer recomposes the picture, the autofocus would continue focussing on whatever is at the selected point of interest marked by indicator 304, so in the example of FIG. 3 b) the camera would continuously adjust the focus to keep the subject's chest, not her eyes, in focus. In previously existing cameras, the photographer would have to set the focus point of interest manually to the part of the camera's field of view that corresponds to the subject's eyes in the final composition of the image, marked by indicated 306. Thus, the photographer with prior-art cameras must choose between using the half-press technique with locking the autofocus, which suffers from the problem discussed in the Background section, or manually setting the desired point of interest, which can be slow and cumbersome.

The present embodiment offers a faster and more elegant solution. With the switch 208 in 'AF-C' mode, the autofocus engages on half-press with the point of interest marker 304 aimed at the point of interest, the subject 302's eyes, as shown in FIG. 3 a). When the photographer recomposes the picture as shown in FIG. 3 b), the camera senses its rotation in space and immediately adjusts the focus as in the previous case where the focus got locked. The camera also changes the point of interest for the autofocus so that even though the camera got rotated, the point of interest will remain the same in an outside coordinate system that did not get rotated. The camera indicates this by turning off the point of interest indicator 304 and activating, when the camera is rotated to the position shown in FIG. 3 b), the new point of interest indicator 306. The continuous autofocus keeps operating, optimizing focus with respect to the selected direction with respect to the outside world, and thus with respect to the correct element of the image, and if necessary readjusts focus as the subject or the photographer moves.

In order to optimize speed of operation, the camera may be adapted to use data reported by the rotation sensor simultaneously with data from the autofocus sensor. A Kálmán filter or similar state space filter may be chosen to calculate an expected change in focus observation based on the camera's rotation, taking into account measurement errors both of the focus sensors and of the rotation sensors. This filter then generates an estimate, based upon both changes from the autofocus sensor and from the rotation sensor, of the appropriate change in focus. Thus, focus will change appropriately immediately upon rotation being sensed, even if the focus sensor may take a longer time to generate useful output.

This mode of operation brings two major advantages over existing ways of operating a continuous autofocus. First, it enables the photographer to use the quick and convenient half-press technique to select an area of interest for the autofocus merely by half-pressing the shutter button and rotating the camera, a much faster and easier way than operating additional controls such as a control wheel or a touch screen. Second, since the autofocus responds to the camera's rotation as in the first case, it will automatically adjust while the camera is being rotated without the need to wait for a new autofocus measurement. This is particularly advantageous for cameras where the autofocus operates by evaluating contrast on the image sensor since it saves as lot of trial and error for the autofocus as the camera gets rotated, thus allowing a faster autofocus response time.

Figure 4:
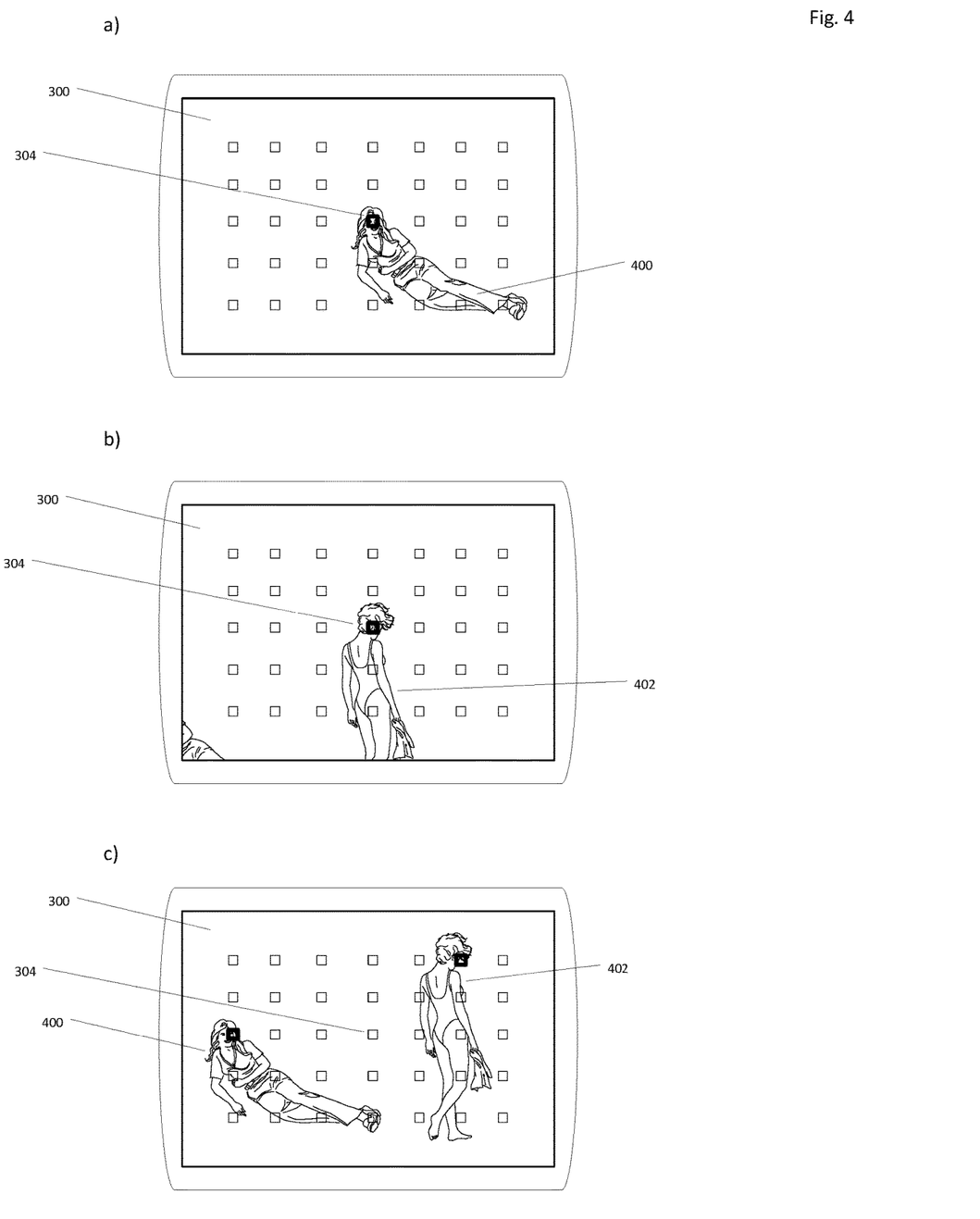
FIG. 4 shows a scenario for taking a picture with two points of interest with the first embodiment.

Multiple Point of Interest Selected: FIG. 4

FIG. 4 shows yet another possibility of using the first embodiment. The photographer now wishes to take an image composed as in FIG. 4 c) with a first subject 400 and a second subject 402, and he would like the eyes of both subjects to be in focus. There are some mechanisms known in the prior art to set multiple points of interest for an autofocus manually, but they tend to be even clumsier than the user interfaces for shifting a single point of interest. Some cameras are equipped with an automatic depth of field mode that calculates an optimal aperture and focus setting to keep multiple points of interest in different planes in focus. The first embodiment makes this mode of operation easy.

We assume that the switch 208 again is in the 'AF-1' position as in the first example. The photographer now points the selected point of interest marker 304, most easily the one in the center of the camera's field of view, at the eyes of the first subject 400, as shown in FIG. 4 a). Now the photographer briefly pushes the 'AF SEL' button 206. This informs the camera that the subject at which the marker 304 is currently pointing is a point of interest. The camera operates the autofocus to measure the distance to this subject, stores it in memory, and adjusts the focus as the camera is rotated as in the previous modes of operation discussed. When the autofocus measurement is completed, the camera gives the photographer an audible or visual confirmation.

Now the photographer points the camera at the eyes of the second subject 402, as shown in FIG. 4 b), and presses button 206 again, informing the camera that this subject, too, is a point of interest. The camera operates the autofocus to measure the distance to this second point of interest and gives a confirmation when the measurement is completed. If the camera is equipped with a variable aperture and an automatic depth of field mode, the camera may modify the aperture so as to make it possible to keep subjects properly focussed even though they are not on one plane of focus. The camera sets the focus to a compromise that will keep both subjects focussed as well as possible. In the simplest case, this may simply be an average of distance to the focal plane that would keep the first subject perfectly focussed and the distance to the focal plane that would keep the second subject perfectly focussed, but better methods are well-known in the art. For example, the camera may run a mathematical optimizer that calculates the blurring for both points of interest for a given focal distance setting and select the focal distance that minimizes the sum of squared blur radii for both subjects. As the camera gets rotated, it keeps recalculating the optimal focal distance to keep both subjects in focus and adjusts the focus accordingly. Note that this is possible even though some of the subjects may not at present be visible in the camera's field of view because the camera has memorized their position in space relative to itself and tracks its own rotation in space. As the focus is being continuously adjusted, the photographer may immediately see how each element of the picture will be in or out of focus in the final picture to be taken. For cameras with adjustable aperture, it is advantageous to offer the photographer the option, such as through a menu setting or a button, to choose between a fully open aperture for a bright preview image and the aperture setting that will be used for taking the picture for an accurate preview of depth of field.

Now the photographer recomposes the picture as shown in FIG. 4 c) and presses the shutter button. As the camera is being rotated into this position, the focus is already set by the mechanism described in the previous paragraph so that the camera can release the shutter immediately, although the camera may perform additional functions, such as setting exposure value, when the shutter button crosses the half-press position. The photographer obtains a picture with both subjects in focus as well as is possible given that they are not on the same focal plane, and all of this was achieved merely by pointing the camera at the objects of interest and marking them with a single button press for each.

The same principle of operation may also be used with the autofocus in continuous mode and multiple points of interest. In this case, the autofocus keeps measuring the distance to the points of interest, provided they are currently in the camera's field of view, and recalculates an optimal focus setting. In some applications, especially with contrast detection autofocus, it can be advantageous not to try to find the subjects' changing distances explicitly but merely to optimize contrast in the selected directions of interest.

For some applications where a photographer may want to take multiple pictures with similar focus settings, it may be advantageous for the selected focus points to remain selected after a picture has been taken. In this case, the camera may be adapted so as to store selected focus points across shots and to delete them and revert to one default focus point and normal half-press focus operation upon a long press on the button 206. In other applications where a photographer wants to focus and compose each picture separately, it may be more advantageous to revert to default focus behavior after each shot. The camera may allow the photographer to choose between the behaviors in a menu setting.

As the camera is adjusting focus for the selected points of interest, it may also adjust additional exposure parameters. For example, the camera may adjust exposure time, aperture, sensor sensitivity, or white balance settings continuously so as to give a good compromise exposure for the selected points of interest.

Figure 5:
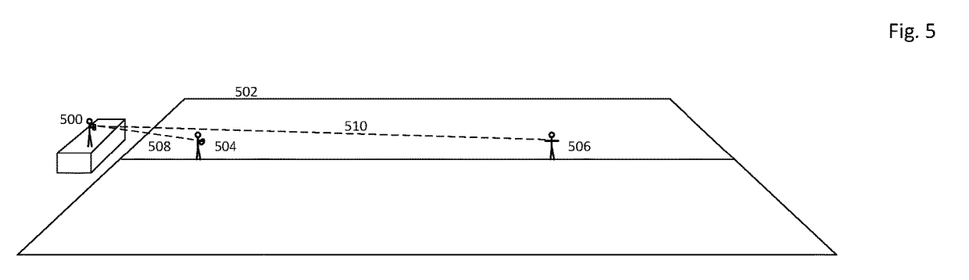
FIG. 5 shows a scenario for using the map mode of the first embodiment.

Map Mode: FIG. 5

In some situations, particularly some variations of sport photography, the photographer often stands at some distance from the action and quickly turns the camera from one part of the scene to another part of the scene at a different distance. Take the example shown in FIG. 5. A photographer 500 stands in a slightly elevated position at the side of a sports field 502. A player 504 currently is in possession of the ball and the photographer may want to take a picture of him. If that player passes the ball to the player 506, the photographer quickly may want to rotate the camera to player 506 and take a photo of him catching the ball. In this situation, there is not much time for the autofocus to respond once the camera is pointing to player 506, or the opportunity for a good shot may have passed. Precise focus is important because these shots are often taken with lenses of very long focal lengths and correspondingly short depth of field, and lighting conditions may require a wide aperture, further reducing depth of field.

This problem can be solved by switching the camera into map mode by turning switch 210 into the 'MAP ON' position. Typically, this will be used with continuous autofocus, thus the switch 208 in 'AF-C' position, although this is not a requirement. Typically, the ability to lock a direction of interest, as described above, will be switched off in map mode since map mode appears most useful for situations where the camera is swung widely, removing a previously selected image element from the camera's point of view. Alternatively, the camera may run map mode until the user locks a direction of interest and then continue optimizing for that direction of interest as described above.

As the photographer is following the action and pointing his camera toward various directions of the field, the autofocus, being in continuous mode, constantly measures the distance to the subject in the camera's field of view. The camera also constantly measures its rotational position in space relative to a coordinate system that may be chosen arbitrarily. The camera is equipped with internal memory and creates a map of focus distance for each direction into which it has measured. In the simplest case, this might be a map that for a grid of latitude and longitude of camera rotation stores the distance last seen at that latitude and longitude. Latitude and longitude are not optimal since they don't create an equal grid over a sphere and suffer from gimbal lock, so a quaternion representation will tend to work better. When the autofocus measures optimal focus distance for a direction for which there already was a map entry, the previous map entry gets overwritten by the new measurement.

As the photographer rotates the camera from pointing to player 504 to player 506, the camera looks up from this map of previously seen distances corresponding to a given direction in space the right focus distance for that direction and changes the focus accordingly. Thus, when the camera arrives at player 506 the focus will already be substantially correct. Since the camera is in continuous autofocus mode, it may still make adjustments to the focus based on a new optical measurement if time remains, but even if no time remains for a new measurement there is a substantial chance of the focus being at least approximately correct. If there is no map entry for a given direction, the camera may try the distance stored for the closest direction for which there is a map entry or use a more advanced inter- or extrapolation scheme, of which many are known in the art, for the same purpose.

The camera may have special user-selectable modes that give it additional map information. For example, for the setting in FIG. 5, the camera may have a mode informing it that the scene is basically a horizontal field. In this case, the camera's mapping may be limited, for directions where the camera points below the horizon, to estimating the camera's height above the field, or, more correctly, the camera's height above the subjects on the field on which the photographer tends to point the camera. For this to work, the coordinate system used by the camera must be aligned with the direction of gravity, for which purpose the camera may be equipped with a MEMS sensor measuring linear acceleration in addition to the sensor measuring rotation. The camera can thus calculate the right focal distance even if it is pointed in a direction for which no measurements have been taken yet.

The camera may also anticipate focus changes. If the camera's direction of view is being rotated rapidly, the camera may, for example, look up and set the focal distance not for the direction in which it is pointed now, but for the distance into which it will look a tenth of a second from now. The direction into which the camera will look may be estimated from the output of the rotation sensors by means of a Kálmán filter modeling the camera's rotational speed and inertia. The amount of anticipation may increase with camera speed and with the weight of the lens currently in use in a camera with user-changeable lenses (in the absence of weight information, focal length of lens is good proxy), since with a heavy camera in rapid motion it is almost certain that the camera will not come to a sudden stop. If, however, the photographer wants to take pictures while swinging the camera, he should switch the anticipation mode off so that the camera optimizes for the direction into which the camera is pointing while the camera is being swung, not for a direction where it may come to rest after the swing is completed. This anticipation is not limited to map mode, but may also be used in the modes of operation discussed previously.

For a camera mounted on a tripod it is often advantageous to keep measuring distances and updating the distance map continuously. For a camera that is hand-held this may lead to spurious results when the camera, for example, dangles freely while it is not in use, and it is often advantageous to update the map only when the shutter-button is in half-press mode. This also extends battery life. In this case, a half-press actuation of the shutter button should not change selected direction of interest with respect to the camera's field of view.

CONCLUSION, RAMIFICATIONS, AND SCOPE

Accordingly, the reader will see that the camera with motion-dependent autofocus shown can be used to set focus points of interest quickly and intuitively, allowing a quicker workflow for photographers, fewer missed shots due to autofocus response time, no focus error due to recomposition, and thus more shots that are perfectly in focus.

Although the description above contains many specificities, these should not be construed as limiting the scope of the embodiments but as merely providing illustrations of some of several embodiments. For example, the rotation sensors may operate on a principle different than microelectromechanical, and the user interface may be a touch screen or another method instead of buttons. The camera may also change other parameters than focus for points of interest selected by pointing the camera and then recomposing; for example, exposure parameters. The camera also need not be an apparatus dedicated primarily to use as a camera. For example, many modern smart mobile telephones are already equipped with cameras, autofocus systems, and rotation sensors, making implementation of some embodiments of the invention possible as a software application on such phones. Although the discussion has been primarily in the context of a still image camera, the same principles are equally useful for a video camera, particularly with continuous focus measurements enabled.

Thus the scope of the embodiments should be determined by the appended claims and their legal equivalents rather than by the examples given.

I claim:

1. An apparatus
    having a preferred direction by which a user may point it to a direction of interest relative to the outside world by aligning said apparatus's preferred direction with said direction of interest,
    said apparatus comprising
    a sensor generating data that can be used to measure changes of said apparatus's rotation in space and
    a user control element to select a direction into which said apparatus is currently pointing as a direction of interest relative to the outside world,
    said apparatus being adapted to allow a user, by actuating said user control element, to add said direction into which said apparatus is currently pointing relative to the outside world to a list of directions of interest relative to said apparatus's position, said list being capable of holding a plurality of said directions of interest, and
    to update said directions of interest relative to said apparatus's position in response to said apparatus's rotation in space, based at least in part on data from said sensor, so as to keep said directions constant with respect to the outside world.

2. The apparatus of claim 1 where said apparatus also comprises a camera and said preferred direction is said camera's lens axis.

3. The apparatus of claim 1 where said apparatus also comprises a camera and a viewfinder, and where said viewfinder shows an image of what said camera sees together with an indication of said preferred direction.

4. The apparatus of claim 3 where said viewfinder is an optical viewfinder.

5. The apparatus of claim 3 where said viewfinder is an electronic display showing a video feed from said camera.

6. The apparatus of claim 1 where said apparatus also comprises a camera and a viewfinder, and where said viewfinder shows an image of what said camera sees together with an indication of said directions of interest.

7. The apparatus of claim 1 where said sensor is a gyroscopic sensor.

8. The apparatus of claim 1 where said sensor is a microelectromechanical sensor.

9. The apparatus of claim 1 where said apparatus also comprises a second user control element and where said apparatus is further adapted to execute a predetermined action with respect to said directions of interest upon a user actuating said second user control element.

10. The apparatus of claim 9 where said predetermined action comprises taking a picture with at least one image-taking parameter optimized for said directions of interest.

11. The apparatus of claim 9 where said apparatus is further adapted to delete said directions of interest after performing said predetermined action.

12. The apparatus of claim 9 where said apparatus is further adapted to keep said directions of interest after performing said predetermined action, and where said apparatus is further adapted to delete said directions of interest upon a user actuating a third user control element.

13. The apparatus of claim 1 where said user control element is a button.

14. The apparatus of claim 1 where said preferred direction is variable with respect to the apparatus.

15. The apparatus of claim 1 where said preferred direction may be chosen by the user from a discrete set of possible directions.

16. The apparatus of claim 1 where said apparatus is portable.

17. The apparatus of claim 1 where said apparatus is a dedicated camera.

18. The apparatus of claim 1 where said apparatus is a smart mobile telephone.

19. An automated method comprising
receiving an actuation state of a user control element,
receiving observations of an apparatus's rotation with respect to the outside world from a sensor, said apparatus having a preferred direction by which a user may point it to a direction of interest relative to the outside world by aligning said apparatus's preferred direction with said direction of interest,
upon observing actuation of said user control element adding a direction into which said apparatus is currently pointing relative to the outside world to a list of directions of interest relative to said apparatus's position, said list being capable of holding a plurality of said directions of interest, and automatically updating a representation of said directions of interest with respect to said apparatus so as to keep said directions of interest pointing in substantively the same respective directions with respect to the outside world using said data from said rotation sensor.

20. The method of claim 19 where said apparatus also comprises a camera and said preferred direction is said camera's lens axis.

21. The method of claim 19 where said apparatus also comprises a camera, and where said method further comprises displaying an indication of said preferred direction in a viewfinder showing an image of what said camera sees.

22. The method of claim 19 where said apparatus also comprises a camera, and where said method further comprises displaying an indication of said directions of interest in a viewfinder showing an image of what said camera sees.

23. The method of claim 19 where said sensor is a gyroscopic sensor.

24. The method of claim 19 where said sensor is a microelectromechanical sensor.

25. The method of claim 19 where said method further comprises observing a second user control element, and upon actuation of said second user control element to execute a predetermined action with respect to said directions of interest.

26. The method of claim 25 where said predetermined action comprises taking a picture with at least one image-taking parameter optimized for said directions of interest.

27. The method of claim 25 where said method further comprises deleting said directions of interest after performing said predetermined action.

28. The method of claim 25 where said method further comprises keeping said directions of interest after performing said predetermined action, and where said method further comprises deleting said directions of interest upon a user actuating a third user control element.

29. The method of claim 19 where said user control element is a button.

30. The method of claim 19 where said preferred direction is variable with respect to the apparatus.

31. The method of claim 19 where said preferred direction may be chosen by the user from a discrete set of possible directions.

* * * * *